United States Patent [19]

Hayashi et al.

[11] Patent Number: 4,727,982
[45] Date of Patent: Mar. 1, 1988

[54] WORKPIECE TRANSFER APPARATUS

[75] Inventors: Takehiko Hayashi, Toyota; Fumio Sakamoto, Kariya, both of Japan

[73] Assignee: Toyoda Koki Kabushiki Kaisha, Kariya, Japan

[21] Appl. No.: 7,401

[22] Filed: Jan. 27, 1987

[30] Foreign Application Priority Data

Jan. 24, 1986 [JP] Japan .................................. 61-14172

[51] Int. Cl.$^4$ ............................................. B65G 25/00
[52] U.S. Cl. ................................ 198/346.1; 198/774; 198/468.6
[58] Field of Search ............... 198/346.1, 346.2, 339.1, 198/465.1, 621, 774, 468.6, 468.2, 468.4, 468.5; 414/744 R, 750–753, 222, 225, 226

[56] References Cited

U.S. PATENT DOCUMENTS

| | | | |
|---|---|---|---|
| 3,017,010 | 1/1962 | Wiggins et al. | 198/468.6 |
| 3,075,651 | 1/1963 | Kaden | 414/753 |
| 3,361,250 | 1/1968 | Pierce et al. | 198/221 |
| 3,417,857 | 12/1968 | Hickey | 198/465.1 |
| 3,930,440 | 1/1976 | Ohkawa | 198/774 |
| 4,404,837 | 9/1983 | Allen et al. | 198/621 |
| 4,515,025 | 5/1985 | Missio et al. | 198/468.6 |
| 4,630,461 | 12/1986 | Votava | 198/621 |

FOREIGN PATENT DOCUMENTS 51-44384  4/1976  Japan .

Primary Examiner—Joseph E. Valenza
Attorney, Agent, or Firm—Oblon, Fisher, Spivak, McClelland & Maier

[57] ABSTRACT

In a workpiece transfer apparatus for a plurality of serially arranged machine tools, a horizontally extending transfer bar which forms a part of a parallel motion mechanism is provided alongside work tables of the machine tools and is vertically movable. A plurality of linear motion members is mounted on said transfer bar at the same interval as the machine tools and is connected to be bodily movable along the transfer bar. Each of the linear motion members carries a plurality of arm members each pivotable about a vertical axis for horizontal swing motion. A transfer jig for supporting a workpiece thereon is secured to each of the arm members. A feed cylinder device is provided to move the linear motion members along the transfer bar so as to transfer each workpiece from a position facing one machine tool to another position facing another machine tool successive thereto. A loading cylinder device is provided to horizontally swing all or a corresponding one of the arm members so as to load workpieces onto the work tables and unload the same therefrom. Further, an elevation cylinder device is provided to vertically move the transfer bar so as to seat the workpieces on the work tables and lift up the same therefrom.

8 Claims, 7 Drawing Figures

WORKPIECE TRANSFER APPARATUS

BACKGROUND OF THE INVENTION

1. Field of the Invention

The present invention relates generally to a transfer apparatus for simultaneously transferring a plurality of workpieces to machining stations of machine tools and more particularly, to such a transfer apparatus suitable for use in constructing a flexible transfer line.

2. Discussion of the Prior Art

A known transfer machine is provided with a transfer apparatus for transferring workpieces from a machining station of a machining unit to that of another machining unit next thereto one after another. Typically, such a transfer apparatus is constructed as of a lift-and-carry type which is provided with a transfer bar movable in a vertical direction and a horizontal axial direction. The transfer bar has fixed thereto a plurality of transfer jigs each for supporting and positioning a workpiece thereon. In each of the machining stations, a pair of upstanding support plates are provided at opposite sides of the transfer bar, and a set of machining station jigs are respectively fixed on the tops of the upstanding support plates.

However, because the jigs on each machining station are provided fixed, there is raised such a problem that a workpiece on each machining station cannot be machined at any other surface than that facing a machining unit. If an attempt were made to design machining station jigs angularly indexable on each machining station, a special arrangement would have to be made to avoid the interferences of the jigs and upstanding support plates with the transfer bar, thereby resulting in a complicated configuration of each machining station. This make it impossible the use of the known transfer apparatus of the lift-and-carry type in a flexible transfer line wherein a plurality of machine tools each controllable in accordance with a numerical control program are arranged to make a line each for a limited step of various machinings to be effected on each workpiece.

In another method of transferring workpieces between work tables of a plurality of machine tools, there can be used transfer carts. However, such a method disadvantageously results in an increased cost because many transfer carts are required, and also results in a longer transfer time because the traveling speed of the transfer carts are generally slow.

SUMMARY OF THE INVENTION

Accordingly, it is a primary object of the present invention to provide an improved workpiece transfer apparatus which is not only capable of effectively utilizing advantages of the aforementioned lift-and-carry type, but also capable of coexisting with machining stations each incorporating a rotary work table.

Another object of the present invention is to provide an improved workpiece transfer apparatus which is suitable for use in a flexible transfer line.

Briefly, in a workpiece transfer apparatus according to the present invention, a transfer unit is disposed alongside work tables of a plurality of machine tools arranged to make a line in a first horizontal direction and is reciprocatively movable in the first horizontal direction and a vertical direction. A plurality of transfer jigs each capable of carrying a workpiece to be loaded onto one of the work tables are provided on the transfer unit at the same interval as the machine tools. The transfer jigs are respectively carried by transfer jig supports to be movable in a second horizontal direction which extends substantially across said first horizontal direction. The transfer unit is moved by a first feed device in the first horizontal direction so as to transfer each of the transfer jigs from one of the machine tools to another successive thereto. A second feed device operates to move all or a corresponding one of the transfer jigs in the second horizontal direction so as to present each transfer jig to the work table before which it stands and retract the same therefrom. A third feed device operates to vertically move the transfer unit, so that each transfer jig at the presented position puts the workpiece carried thereby on the work table for loading and removes the same therefrom for unloading.

With this configuration, since the transfer unit for simultaneously transferring a plurality of workpieces is provided separately from the work tables, no modification is required with respect to the machine tools, so that the machine tools can be composed by general-purpose, numerically control machine tools known as, for example, machining centers. Moreover, since the transfer jigs are moved along a fixed path, the positioning of each transfer jig is reliable and precise, so that the transfer speed can be increased.

BRIEF DESCRIPTION OF THE ACCOMPANYING DRAWINGS

The foregoing and other objects, features and many of the attendant advantages of the present invention will be readily appreciated as the same becomes better understood by reference to the following detailed description of preferred embodiments when considered in connection with the accompanying drawings, wherein like reference numerals designate identical or corresponding parts throughout the several views, and in which.

DETAILED DESCRIPTION OF THE PREFERRED EMBODIMENTS

Figure 1:
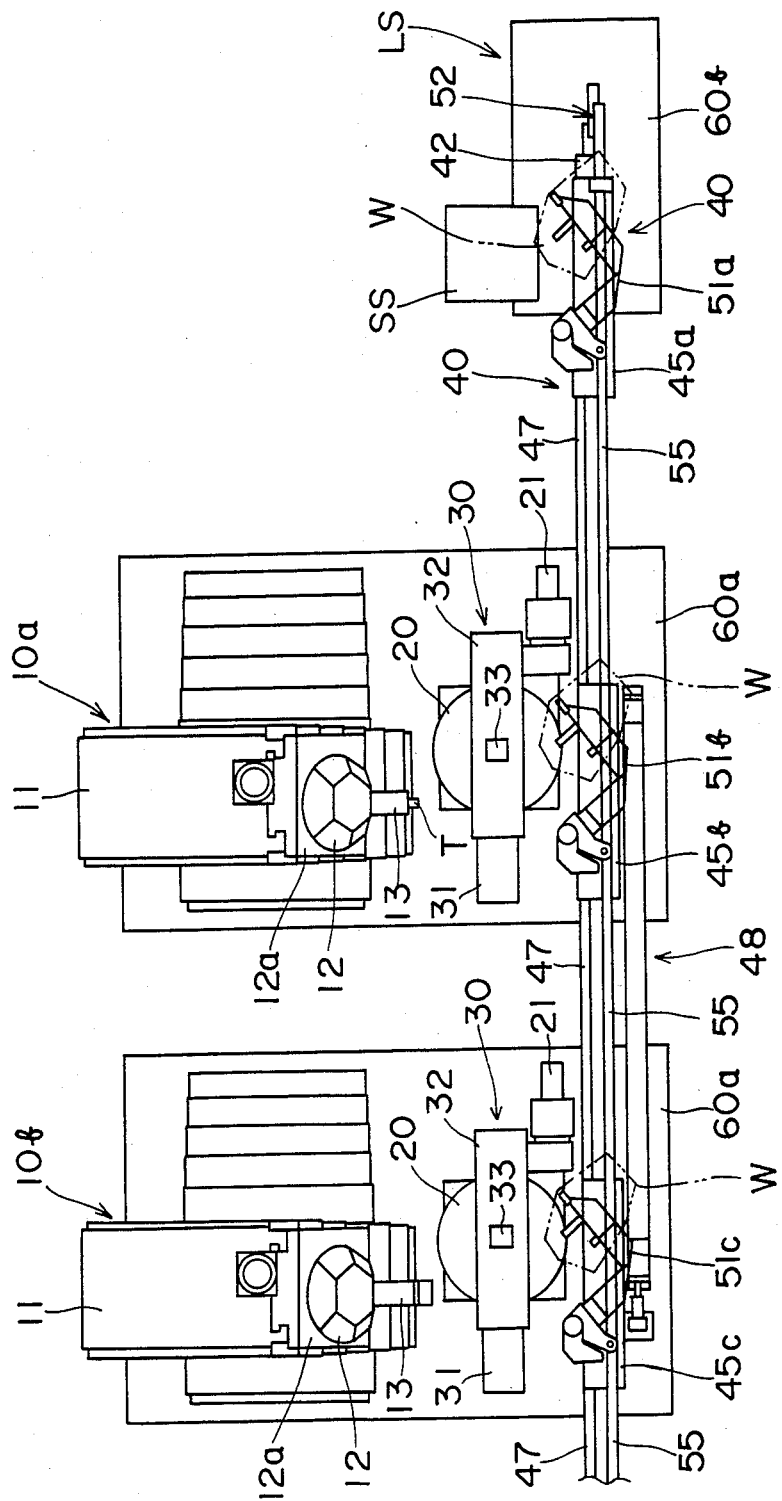
FIG. 1 is a plan view of a flexible transfer line incorporating a workpiece transfer apparatus according to the present invention.
Figure 2:
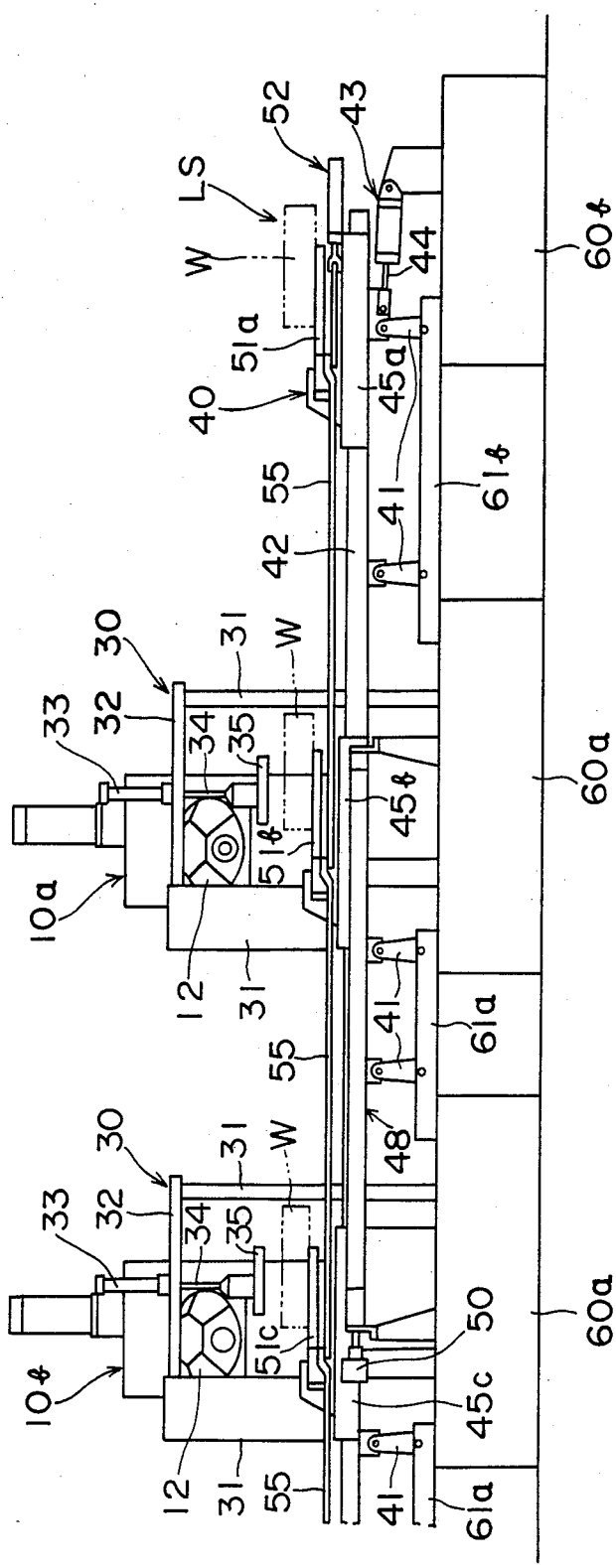
FIG. 2 is an elevational view of the flexible transfer line shown in FIG. 1.

Referring to the drawings and particularly to FIGS. 1 and 2 thereof, reference numerals 10a, 10b denote first and second numerical control machine tools each having a tool turret 12. Each of the machine tools 10a, 10b is provided at a front portion of a bed 60a thereof with a rotary table 20 which is angularly indexable about a vertical axis. Each of the machine tools 10a, 10b is also provided with a clamping device 30 for clamping a workpiece W on the rotary table 20 from the above. At the front sides of the rotary tables 20 and alongside the same, there is disposed a transfer apparatus 40 for simultaneously transferring a plurality of workpieces W one after another to the rotary tables 20 constituting machining stations for the machine tools 10a, 10b. It is to be noted that although only two machine tools 10a, 10b are illustrated for the sake of brevity, there may be provided three or more machine tools which are of the same or different configurations.

Each of the machine tools 10a, 10b is further provided with a column 11 which is horizontally movable on the bed 60a in an orthogonal directions, namely in a left-right direction and a front-rear direction. A spindle head 12a is mounted on the front side of each column 11 for vertical movement. Each tool turret 12 is provided with a plurality of tool spindles 13 (only one shown in the figure) each carrying a cutting tool T. Each tool turret 12 is angularly indexable to horizontally present one of the tool spindles 13 before the workpiece W on the rotary table 20.

Figure 3:
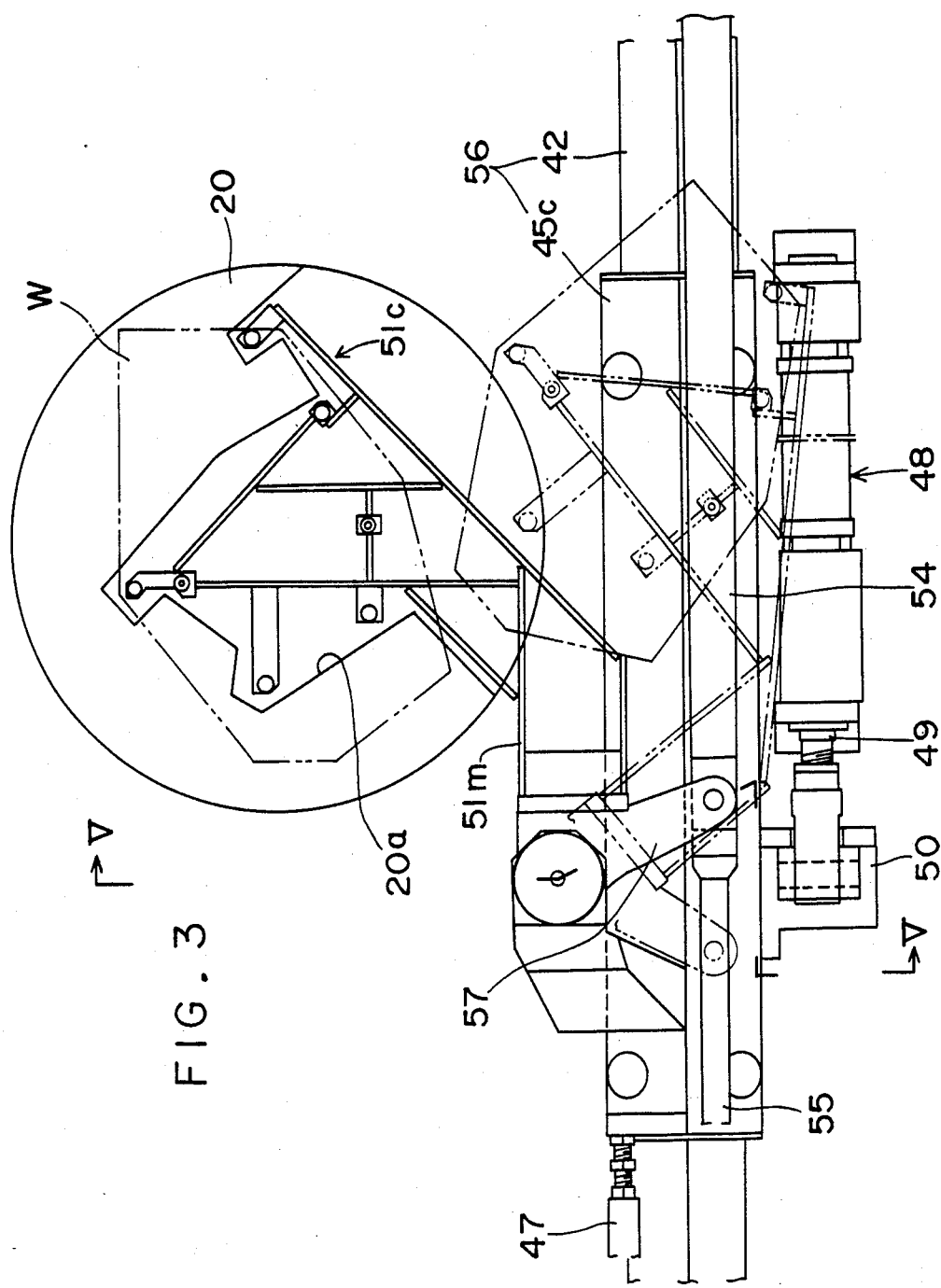
FIG. 3 is a fragmentary plan view of a part of the workpiece transfer apparatus.

Each of the rotary tables 20 is formed at its top with a depression 20a which permits a transfer jig described later of the transfer apparatus 40 to enter, as shown in FIG. 3. A table jig (not shown) for supporting and positioning the workpiece W is fixed on the top portion except for the depression 20a of the rotary table 20. Each rotary table 20 is angularly indexable by an indexing motor 21.

As best shown in FIG. 2, each of the clamping devices 30, 30 comprises a cross beam 32 which is secured to the top ends of a pair of supporting posts 31 mounted on the bed 60a, and a cylinder device 33 is attached to the cross beam 32 for clamping the workpiece W on the rotary table 20. A piston rod 34 of the cylinder device 33 is vertically movable toward and from the rotary table 20 and has attached to its lower end a clamping member 35 which is rotatable about the rotational axis of the rotary table 20.

A bridge member 61a is secured at opposite ends thereof to the beds 60a, 60a of the machine tools 10a, 10b for connection therebetween. Another bridge member 61b is also secured at opposite ends thereof to one of the beds 60a and a base 60b of a loading station LS for connection therebetween. The transfer apparatus 40 is mounted on the bridge members 61a and 61b.

The transfer apparatus 40 comprises a plurality of links 41, each of which is pivotably carried on one of the bridge members 61a, 61b at its lower end. A transfer bar 42 is pivotably carried at the upper ends of the links 41 to extend horizontally. Thus, the transfer bar 42 constitutes a parallel motion mechanism together with the bridge members 61a, 61b and the links 41. The loading station base 60b carries through a bracket (not numbered) a lift cylinder device 43 which is swingable within a vertical plane. A piston rod 44 of the lift cylinder device 43 is pivotably connected to the transfer bar 42 at one end thereof.

Figure 4:
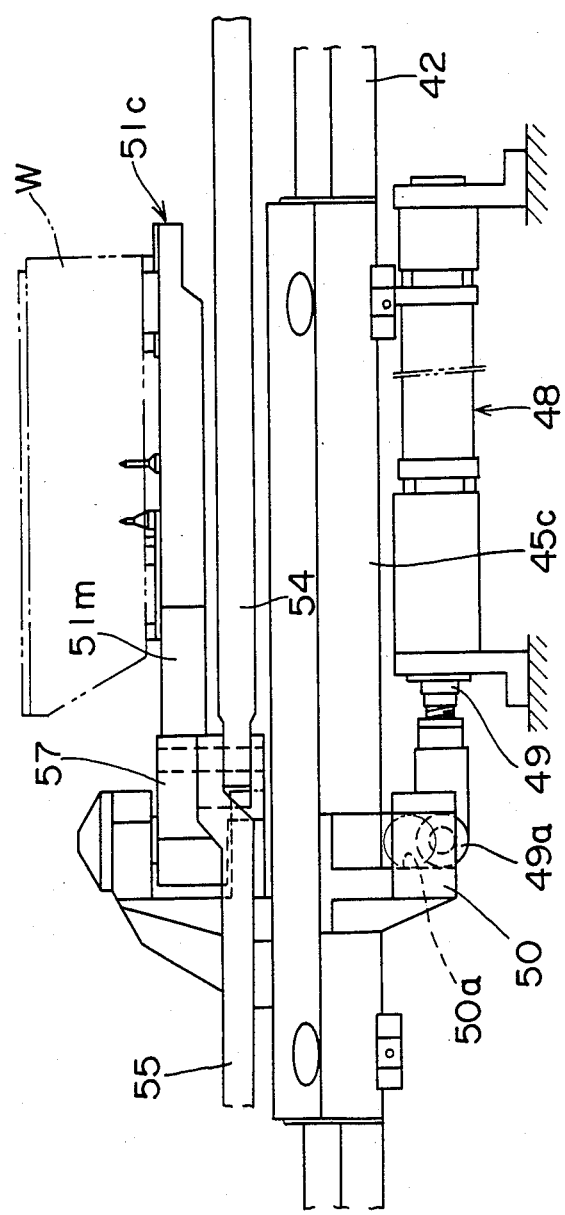
FIG. 4 is a fragmentary elevational view of the part shown in FIG. 3.
Figure 5:
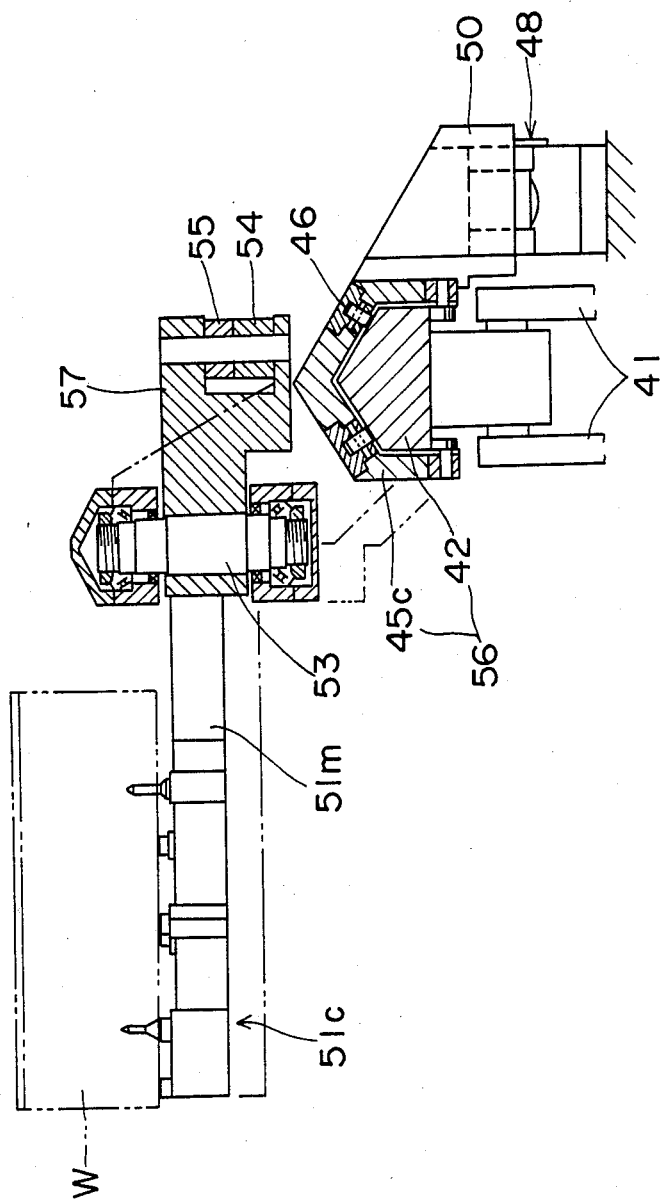
FIG. 5 is a fragmentary sectional view of the transfer apparatus taken along the line V—V in FIG. 3.

As also shown in FIGS. 3, 4 and 5, the transfer bar 42 slidably guides through rollers 46 first and third linear motion members 45a–45c, which are connected in series by a number of connecting rods 47 at the same interval as the machine tools 10a, 10b. The linear motion members 45a–45c, together with the transfer bar 42, constitutes a transfer unit 56. Alongside the transfer bar 42, a feed cylinder device 48 is provided with its opposite ends being fixed on the beds 60a, 60a through a pair of brackets (not numbered). A piston rod 49 of the feed cylinder device 48 is engaged with an engaging block 50 secured to the third linear motion member 45c and is movable relative to the engaging block 50 only in a vertical direction. More specifically, as shown in detail in FIG. 4, the piston rod 49 rotatably carries at its one end a roll 49a, which is accommodated in a vertical guiding groove 50a formed in the engaging block 50.

Figure 6:
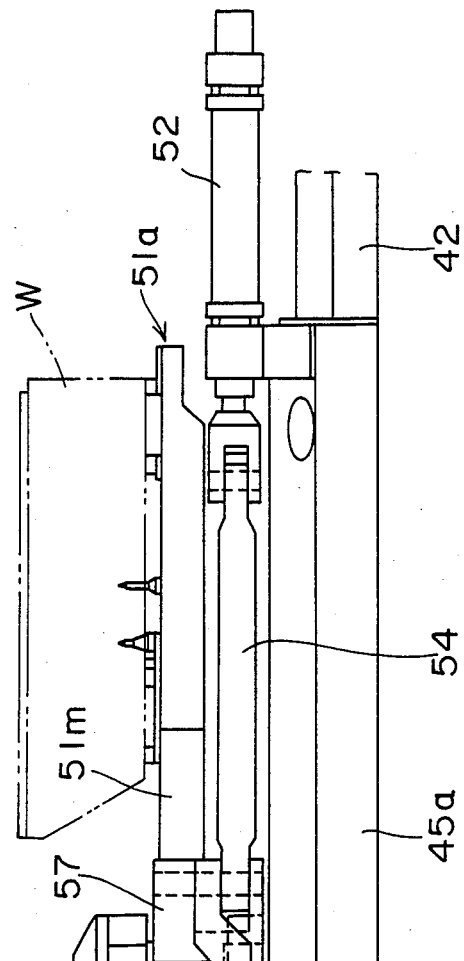
FIG. 6 is a fragmentary elevational view of another part of the workpiece transfer apparatus.

The linear motion members 45a–45c respectively carry first to third transfer jigs 51a–51c each swingable about a vertical pivot shaft 63 within a horizontal plane. Each of the transfer jigs 51a–51c is composed of a horizontally swingable arm portion 51m, one or two positioning pins and several seat members (not numbered) which are secured to the free end of the arm portions 51m. Each of the transfer jigs 51a–51c is bodily formed with a lever 57. As shown in FIG. 6, a cylinder device 52 for swinging the transfer jigs 51a–51c is attached to the first linear motion member 45a which is movable between the loading station LS and the first machine tool 10a next thereto. A piston rod 53 of the cylinder device 52 is pivotably connected to one end of a drive link 54, the other end of which is pivotably connected to the lever 57 of the first transfer jig 51a. A connecting rod 55 is provided between the levers 57 of the first and second transfer jigs 51a, 51b for pivotal connection therebetween, and similarly, another connecting rod 55 is provided between the levers 57 of the second and third transfer jigs 51b, 51c.

Operation of the apparatus as constructed above will be described hereafter. In the original state of operation shown in FIG. 1, the linear motion members 45a–45c are at the right or retracted stroke end, and each of the transfer jigs 51a–51c is also at the retracted end where the substantial part thereof is over the transfer bar 42, as indicated by the phantom line in FIG. 3. When a transfer command is given in the original state, the cylinder device 52 is operated to pivotally advance the transfer jigs 51a–51c. At the advanced end, the first transfer jigs 51a is placed under a new workpiece W supported on a support stand SS located at the loading station LS, while each of the second and third transfer jigs 51b and 51c is entered into the depression 20a formed on each rotary table 20 to be placed under the workpiece W on the rotary table 20. Subsequently, the cylinder device 43 is operated to lift up the transfer bar 42, whereby each of the transfer jigs 51a–51c carries the workpiece W in the mid course of such lift-up motion. When the transfer bar 42 reaches its upper end, the cylinder device 52 is adversely operated to retract the transfer jigs 51a–51c, whereby the workpieces W on the transfer jigs 51a–51c are held over the transfer bar 42. The cylinder device 48 is then operated to advance the transfer bar 42. This causes the new workpiece W on the first transfer jig 51a to be moved before the rotary table 20 of the first machine tool 10a and also causes the workpieces W on the second and third transfer jigs 51b, 51c to be respectively moved before the rotary table 20 of the second machine tool 10b and before a support stand of an unloading station (not shown). Thereafter, the cylinder device 52 is again operated to advance the transfer jigs 51a–51c, so that the new workpiece W is brought over the rotary table 20 of the first machine tool 10a, while the workpieces W on the second and third transfer jigs 51b, 51c are brought over the rotary table 20 of the second machine tool 10b and the support stand of the unloading station, respectively. The cylinder device 43 is then adversely operated to lower the transfer bar 42, whereby the workpieces W are seated on the rotary tables 20 of the first and second machine tools 10a, 10b and the support stand of the unloading station. The adverse operation of the cylinder device 52 then follows to retract the transfer jigs 51a–51c over the transfer bar 42, which is thereafter retracted by the adverse operation of the cylinder device 48 to complete one transfer cycle of the transfer apparatus 40.

The workpieces W now mounted on the rotary tables 20 are then clamped thereon by the operation of the clamping devices 30. The columns 11 of the machine tools 10a and 10b are subsequently advanced with the tool spindles 13 rotating, so as to machine one surface of each workpiece W. Other surfaces of each workpiece W can be machined by rotationally indexing the rotary table 20 carrying such each workpiece W. By the repetition of the aforementioned transfer cycle, each workpiece W which has been machined by one of the machine tools 10a, 10b is transferred onto the rotary table 20 of the second machine tool 10b or onto the support stand of the unloading station.

Being able to simultaneously transfer a plurality of workpieces W by the three cylinder devices 43, 48 and 52 for lift, advance/retract and swing motions as described above, the transfer apparatus of the first embodiment is low in manufacturing cost and speedy in transfer operation.

Figure 7:
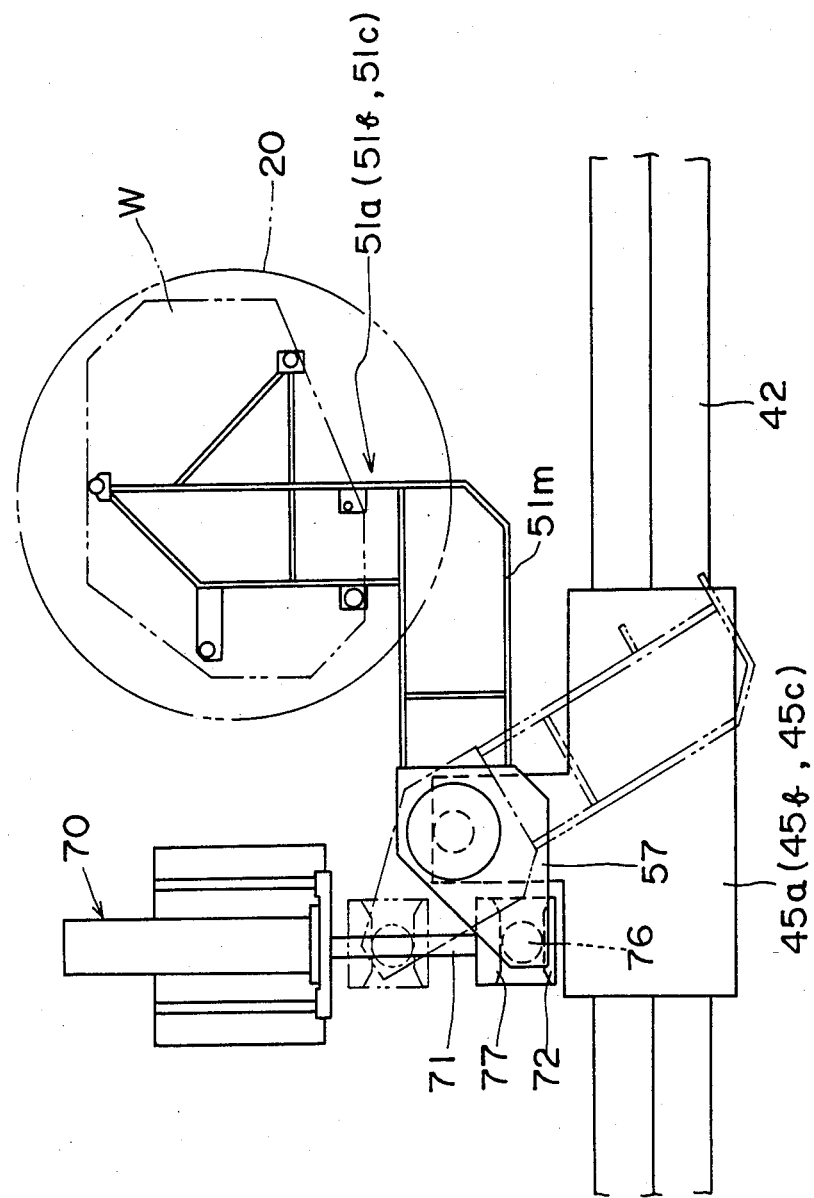
FIG. 7 is a fragmentary plan view similar to FIG. 3, but showing another embodiment of the workpiece transfer apparatus according to the present invention.

FIG. 7 shows another embodiment of the transfer apparatus according to the present invention. In this embodiment, a cylinder device 70 for swing motion is provided at each of the machining, loading and unloading stations. More specifically, a piston rod 71 of each cylinder device 70 is provided with an engaging member 72 having a groove 77 extending in parallel relation with the transfer bar 42, and each of the levers 57 which are bodily swingable with the respective transfer jigs 51a–51c is provided with a roller 76 fittable in the groove 77. The cylinder device 70 is disposed so that when the linear motion members 45a–45c are moved to one of the stroke ends, the roller 76 of each lever 57 is accommodated in the groove 77 of the engaging member 72 of one of the cylinder devices 70 respectively disposed at the two stations between which the transfer jig 51a (51b, 51c) integral with each such lever 57 is movable. When the linear motion members 45a–45c reach one of the stroke ends, each cylinder device 70 for the associated station is operated, whereby the workpiece W is loaded onto the rotary table 20 of the associated station or is unloaded therefrom.

In a modified form of the present invention, the linear motion members 45a–45c may be omitted by enabling the transfer bar 42 per se to move in a vertical direction and a horizontal axial direction and by pivotably providing the transfer jigs 51a–51c directly on the transfer bar 42.

It is to be noted that the transfer apparatus according to the present invention may be used for machine tools each having a non-rotatable work table, and that the machine tools for which the transfer apparatus according to the present invention is used may be numerical control machine tools designed for general purposes though they have been described as those for limited purposes in the embodiments.

Obviously, numerous modifications and variations of the present invention are possible in light of the above teachings. It is therefore to be understood that within the scope of the appended claims, the present invention may be practiced otherwise than as specifically described herein.

What is claimed is:

1. A workpiece transfer apparatus for a plurality of machine tools arranged to make a line in a first horizontal direction and each having a work table onto which workpieces are loaded one after another, said transfer apparatus comprising:
   a transfer unit disposed alongside said work tables of said machine tools and reciprocatively movable in said first horizontal direction and a vertical direction;
   a plurality of transfer jigs provided on said transfer unit at the same interval as said machine tools and each capable of carrying a workpiece to be loaded onto one of said work tables;
   jig support means for supporting each of said transfer jigs to be movable in a second horizontal direction which extends substantially across said first horizontal direction;
   first feed means drivingly connected to said transfer unit for moving the same up and down to raise and lower the workpieces relative to said work tables;
   second feed means drivingly connected to said transfer unit for reciprocatively moving the same in said first horizontal direction to advance the workpieces from work table to work table; and
   third feed means drivingly connected to said plurality of transfer jigs for moving the same in said second horizontal direction to move the workpieces laterally into or out of said work tables.

2. A workpiece transfer apparatus as set forth in claim 1, wherein said transfer unit comprises:
   a transfer bar horizontally extending alongside said work tables in said first horizontal direction and movable in said vertical direction;
   a plurality of linear motion members guided on said transfer bar at the same interval as said machine tools and respectively supporting said transfer jigs by said jig support means to permit said transfer jigs movable in said second horizontal direction; and
   connecting members for connecting said linear motion members to one another.

3. A workpiece transfer apparatus as set forth in claim 2, wherein said jig support means comprises:
   arm members respectively carrying said transfer jigs and each mounted on one of said linear motion members to be horizontally pivotable between a retracted position where said transfer jig is over the transfer bar and an advanced position where said transfer jig is presented over one of said work tables;
   said third feed means being connected to said arm members for horizontally rotating each of said arm members between said retracted and advanced positions.

4. A workpiece transfer apparatus as set forth in claim 3, wherein said third feed means comprises:
   a single actuator mounted on one of said linear motion members for pivotably moving one of said arm members carried on said one of said linear motion members; and
   at least one connecting member for operatively connecting said one of said arm members to others of said arm members.

5. A workpiece transfer apparatus as set forth in claim 3, wherein said third feed means comprises:
   a plurality of actuators fixedly provided and respectively associated with said work tables;
   engaging members respectively operatively connected to said plurality of actuators and each engageable with one of said arm members when each of said linear motion members is moved to one of its stroke ends, for horizontally moving said one of said arm members between said retracted and advanced positions.

6. A workpiece transfer apparatus as set forth in claim 2, wherein said second feed means comprises:
an antifriction member;
a single actuator for reciprocatively moving said antifriction member in said first horizontal direction; and
an engaging member secured to one of said linear motion members and formed with a vertical guiding groove accommodating therein said antifriction member so as to be movable vertically relative to said antifriction member.

7. A workpiece transfer apparatus as set forth in claim 2, furthe comprising:
base means; and
a plurality of vertical links each pivotably carried on said base means at its lower end for pivotal movement within a vertical plan and pivotably connected to said transfer bar at upper ends thereof;
wherein said first feed means comprises:
an actuator connected for pivotably moving said plurality of vertical links within said vertical plane so as to move said transfer bar up and down.

8. A workpiece transfer apparatus as set forth in claim 7, wherein said base means comprises:
at least one bridge member mounted at opposite ends thereof on beds of said machine tools.

* * * * *